(12) United States Patent
Perron et al.

(10) Patent No.: US 11,906,389 B1
(45) Date of Patent: Feb. 20, 2024

(54) SYSTEM AND METHOD FOR ASSISTING IN FIBER OPTIC SPLICES

(71) Applicant: EXFO Inc., Quebec (CA)

(72) Inventors: Stephane Perron, Quebec (CA); Michel Leclerc, Quebec (CA)

(73) Assignee: EXFO Inc., Quebec (CA)

( * ) Notice: Subject to any disclaimer, the term of this patent is extended or adjusted under 35 U.S.C. 154(b) by 119 days.

(21) Appl. No.: 17/660,077

(22) Filed: Apr. 21, 2022

Related U.S. Application Data

(60) Provisional application No. 63/260,731, filed on Aug. 30, 2021, provisional application No. 63/178,879, filed on Apr. 23, 2021.

(51) Int. Cl.
| | |
|---|---|
| G01M 11/00 | (2006.01) |
| H04B 10/071 | (2013.01) |
| G02B 6/255 | (2006.01) |

(52) U.S. Cl.
CPC ....... G01M 11/3109 (2013.01); H04B 10/071 (2013.01); G02B 6/255 (2013.01)

(58) Field of Classification Search
CPC ..... G02B 6/255; H04B 10/071; G01M 11/31; G01M 11/3109; G01M 11/3118; G01M 11/3127; G01M 11/3136; G01M 11/3145; G01M 11/3154; G01M 11/3163; G01M 11/3181; G01M 11/319

See application file for complete search history.

(56) References Cited

U.S. PATENT DOCUMENTS

| | | | | |
|---|---|---|---|---|
| 4,548,494 | A * | 10/1985 | Geckeler | G02B 6/3803 |
| | | | | 356/73.1 |
| 4,875,772 | A * | 10/1989 | Gentile | G01M 11/3136 |
| | | | | 356/73.1 |
| 5,754,285 | A | 5/1998 | Eslambolchi et al. | |
| 7,099,581 | B2 * | 8/2006 | Evangelides, Jr. .. | H04B 10/071 |
| | | | | 398/13 |
| 9,197,319 | B2 * | 11/2015 | Lee | H04B 10/071 |
| 9,485,016 | B2 | 11/2016 | Kassler | |
| 9,506,838 | B2 * | 11/2016 | L'Heureux | G01M 11/3145 |
| 9,825,700 | B2 * | 11/2017 | Ruchet | H04B 10/07955 |
| 10,161,829 | B2 | 12/2018 | Brillhart et al. | |
| 10,862,582 | B1 | 12/2020 | L'Heureux et al. | |
| 11,408,801 | B2 * | 8/2022 | Roux | G01M 11/3145 |

(Continued)

FOREIGN PATENT DOCUMENTS

| | | | | |
|---|---|---|---|---|
| CN | 110635840 A | * | 12/2019 | ............. H04B 10/07 |

OTHER PUBLICATIONS

Anritsu, "Understanding OTDRs," Issue 1, Nov. 2011, 60 pgs.
EXFO Inc., "OTDR Optical Time Domain Reflectometer," 2013-2019, Version No. 15.0.1.1, pp. 1-243.

*Primary Examiner* — Gordon J Stock, Jr.
(74) *Attorney, Agent, or Firm* — Helene Chotard

(57) ABSTRACT

There is provided a system and a method for assisting a technician in fiber optic cable splices and comprising a pair of test units including an OTDR, an optical switch, a tone generator and a tone detector to automate the splicing process and testing. The test units may be in communication with a wireless portable device used by the splicing technician and controlled therefrom. In one embodiment, the test units are driven by a test orchestrator application (e.g., server-based) to switch fibers, perform continuity tests and/ or splice quality tests, triggered by the technician's portable device.

21 Claims, 11 Drawing Sheets

(56) References Cited

U.S. PATENT DOCUMENTS

| | | | |
|---|---|---|---|
| 11,480,496 B2 * | 10/2022 | Perron | G01M 11/3145 |
| 2007/0103670 A1 * | 5/2007 | Sezerman | H04B 10/071 |
| | | | 356/73.1 |
| 2022/0360327 A1 * | 11/2022 | Roux | H04B 10/66 |

* cited by examiner

Step 0 – Detect cable segments

SYSTEM AND METHOD FOR ASSISTING IN FIBER OPTIC SPLICES

TECHNICAL FIELD

The present description generally relates to optical fiber cable testing tools, and more particularly to testing optical fiber splices.

BACKGROUND

The process of splicing two cables together is not simple and is often prone to splicing errors. Optical fiber links within a cable can be mixed up, thereby breaking continuity of some already labeled circuits.

In order to avoid such errors, technicians commonly employ a light source and a power meter connected at opposite ends of the spliced fiber to check its continuity once the splice is completed, i.e., that the fiber port on Site A is connected to expected fiber port on Site B (see FIG. 1). Once the splice is completed and continuity is confirmed, an Optical Time-Domain Reflectometer (OTDR) measurement is typically performed to test the quality of the splice.

This common solution involves at least two or three technicians, i.e., one technician at each end of the optical fiber cable to test splices made by a third technician. Furthermore, such solution may help technicians to identify and correct splicing mistakes but will not prevent such mistakes from happening. Technicians can still waste time correcting mistakes.

Some systems exist in the art to remotely control an OTDR measurement device and/or an optical switch. Although such systems can be used to automate some part of the work that would be otherwise performed by one of the technicians, it does not help the splicing technician to prevent splicing mistakes and automation of the process is limited.

There therefore remains a need for a system and a method for assisting technicians in fiber optic cable splices so as to prevent splicing mistakes and automate continuity and quality testing.

SUMMARY

In accordance with one aspect, there is provided a system and a method for assisting a technician in fiber optic cable splices and comprising a pair of test units including an OTDR, an optical switch, a tone generator and a tone detector to automate the splicing process and testing. The test units may be in communication with a wireless portable device used by the splicing technician and controlled therefrom. In one embodiment, the test units are driven by a test orchestrator application (e.g., server-based) to switch fibers, perform continuity tests and/or splice quality tests, triggered by the technician's portable device.

The test units advantageously include link continuity testing functionality to check whether the fiber spans being spliced are properly matched. Link continuity testing can be used to assist the technician in confirming that the fiber spans being spliced are properly matched before and/or after splicing, thereby allowing the splicing technician to work without the assistance of one or more additional technicians on either ends of the optical fiber link. Once the splice is completed, the splice quality test (OTDR measurement) can be launched (either automatically or remotely controlled by the user), again without the assistance of one or more additional technicians.

For link continuity testing, the system uses a tone signal injected in the optical fiber link. Optionally, the technician can use the tone signal before splicing, in order to identify the fiber link to be spliced (i.e., using a hand-held tone detector). Alternatively or additionally, tone signal detection at the remote test units can be used during splicing or after splicing for link continuity testing, i.e., whether the fiber spans being spliced properly match. Then, once the splice is completed, each test unit may conduct a splice quality test (e.g., splice loss) by launching an OTDR acquisition toward the spliced link.

There are various ways for the test unit to determine whether the splice is completed before it can launch a splice quality test. In one embodiment, the technician may manually indicate on its portable device that he has completed the splice (via a user input within the user interface), which portable device is in communication with the remote test units. In another embodiment, splice completion can be detected by the remote test unit using tone signal detection and/or a preliminary OTDR acquisition. For example, a stable tone signal, a stable splice loss, a low splice loss and/or a low reflectance at the splice location may be used as indications that the splice is completed. For example, upon tone signal detection, the test unit may launch a preliminary OTDR acquisition to check the splice loss and/or reflectance. Once splice completion is detected from the preliminary OTDR acquisition, the test unit launches a splice quality test.

The remote test units may be at least partly remotely controlled by the technician using a wireless portable device, with the help or not of a test orchestration application. In either case, a single technician is required for the whole splicing, continuity testing and splice quality testing process.

In one embodiment, the OTDR light source is used to generate both the OTDR test signal and the tone signal, the tone signal being obtained, e.g., by modulating the OTDR light source using a tone frequency (e.g., 1 kHz or 2 kHz).

In another embodiment, the OTDR source and the tone source may have different wavelengths and be activated concurrently, the tone detector then including a spectral filter to filter out the OTDR source.

Alternatively, it may also be envisaged to have the OTDR source and the tone source centered on the same wavelength and be activated concurrently, the tone detector including an electronic and/or digital filter to filter out the OTDR source.

In accordance with one aspect, there is provided a test system for assisting a splicing technician in optical fiber splices, the test system comprising:

a first test unit and a second test unit to be connected toward opposite ends of an optical fiber link comprising a first fiber span and second fiber span to be spliced, each test unit having at least one output port and comprising:

an OTDR acquisition device for performing at least one OTDR acquisition toward said output port in order to test a quality of the splice, wherein each OTDR acquisition is performed by propagating in the optical fiber link under test, a pulsed test signal and detecting corresponding return light from the optical fiber link so as to obtain an OTDR trace representing backscattered and reflected light as a function of distance in the optical fiber link;

a tone generator to produce a tone optical signal toward the output port; and a tone detector to detect a presence of a tone signal produced by the tone generator of the opposite test unit and received via the output port, in order to test a continuity of the optical fiber link; and a test application comprising computer instructions to be executed on a wireless portable device used by the splicing technician and in communication with the first test unit and the second test unit, the test application comprising a user interface to display results of continuity tests performed using the first test unit and the second test unit and results of splice quality tests performed by at least one of the first test unit and the second test unit.

In accordance with another aspect, there is provided a method for assisting a technician in optical fiber splices using a first and a second test unit to be connected toward opposite ends of an optical fiber link, the optical fiber link comprising a first fiber span and a second fiber span to be spliced, each test unit having at least one output port, the method comprising:

at least one of the first test unit and the second test unit activating a tone generator to produce a tone optical signal toward an output port;

at least the other one of the first test unit and the second test unit detecting, using a tone detector, a presence of the tone optical signal produced by the tone generator of the opposite test unit and received via the output port in order to test a continuity of the optical fiber link;

on a portable device used by the splicing technician and in communication with the first test unit and the second test unit, displaying a result of a continuity test performed using the first test unit and the second test unit in a user interface, whereby the splicing technician can verify that the spliced fiber spans match;

after the splice is completed, at least one of the first test unit and the second test unit conducting a splice quality test toward the optical fiber link, the splice quality test comprising performing at least one OTDR acquisition toward the output port; and on the portable device used by the splicing technician, displaying a result of the splice quality test, whereby the splicing technician can be informed about the splice quality.

In accordance with yet another aspect, there is provided a non-transitory computer-readable storage medium comprising instructions that, when executed on a network server, cause a processor to perform the steps of:

via a network communication between the network server and a first and a second test unit to be connected toward opposite ends of an optical fiber link comprising a first fiber span and second fiber span to be spliced, each test unit having at least one output port:

a) triggering each of a first test unit and a second test unit to select a first output port among a plurality of output ports, using its respective optical switch;

b) triggering at least one of the first test unit and the second test unit to activate its tone generator to produce a tone optical signal toward the at least one output port, at least the other one of the first test unit and the second test unit to detect a presence of a tone signal produced by the tone generator of the opposite test unit and received via the output port in order to test a continuity of the optical fiber link;

c) sending the result of a continuity test to a wireless portable device used by the splicing technician, whereby the splicing technician can verify that the spliced fiber spans match; and d) after the splice is completed, triggering a splice quality test toward the optical fiber link, the splice quality test comprising at least one of the first test unit and the second test unit performing an OTDR acquisition toward the output port; and e) sending the result of the splice quality test to the wireless portable device used by the splicing technician, whereby the splicing technician can verify if a splice is successful; and f) triggering each of the first test unit and the second test unit to select a second output port among the plurality of output ports, using its respective optical switch and repeating steps b), c) d) and e).

In this specification, unless otherwise mentioned, word modifiers such as "substantially" and "about" which modify a value, condition, relationship or characteristic of a feature or features of an embodiment, should be understood to mean that the value, condition, relationship or characteristic is defined to within tolerances that are acceptable for proper operation of this embodiment in the context its intended application.

Further features and advantages of the present invention will become apparent to those of ordinary skill in the art upon reading of the following description, taken in conjunction with the appended drawings.

Figure 1:
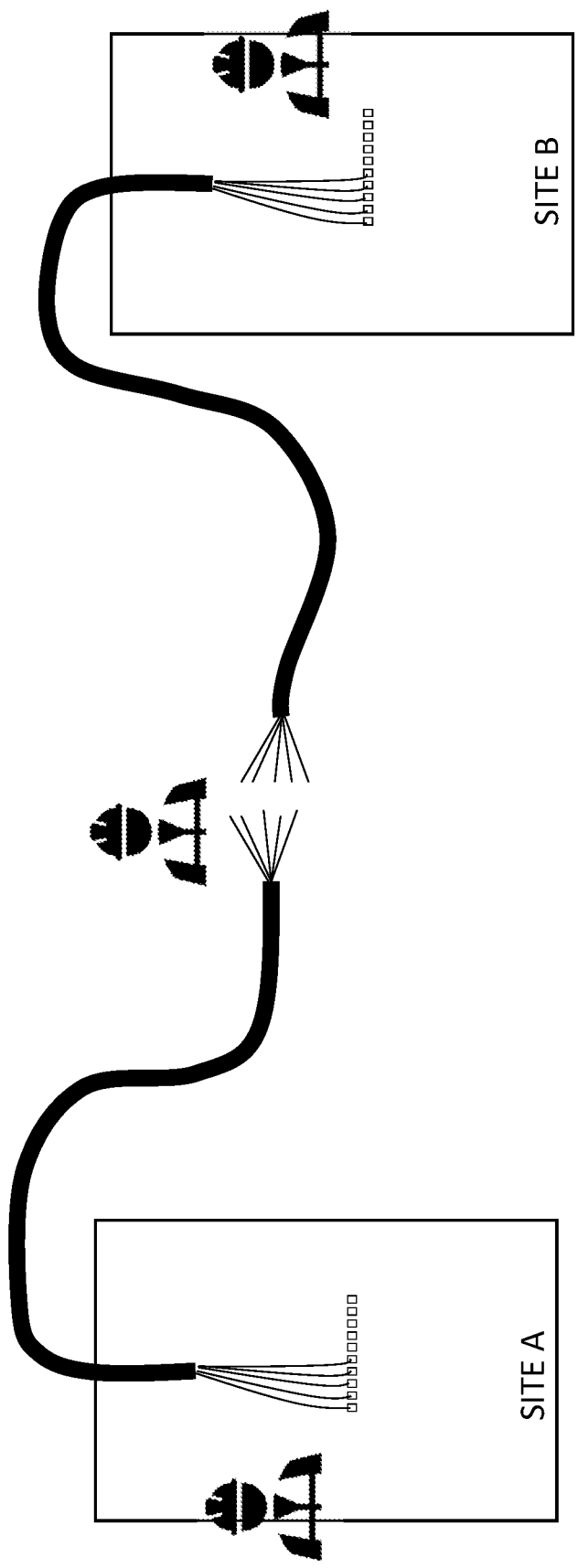
FIG. 1 (PRIOR ART) is a schematic illustrating a prior art method for splicing and splice testing.

It will be noted that throughout the drawings, like features are identified by like reference numerals. To not unduly encumber the figures, some elements may not be indicated in some figures if they were already identified in a preceding figure. It should be understood herein that elements of the drawings are not necessarily depicted to scale. Some mechanical or other physical components may also be omitted in order to not encumber the figures.

The following description is provided to gain a comprehensive understanding of the methods, apparatus and/or systems described herein. Various changes, modifications, and equivalents of the methods, apparatuses and/or systems described herein will suggest themselves to those of ordinary skill in the art. Description of well-known functions and structures may be omitted to enhance clarity and conciseness.

Although some features may be described with respect to individual exemplary embodiments, aspects need not be limited thereto such that features from one or more exemplary embodiments may be combinable with other features from one or more exemplary embodiments.

DETAILED DESCRIPTION

OTDR is a diagnostic technique for optical fiber links where a test signal in the form of light pulses is launched in the optical fiber link under test and the return light signal, arising from backscattering and reflections along the link, is detected. Herein, the process of launching a test signal and acquiring the return light signal to obtain therefrom an OTDR trace is referred to as an "OTDR acquisition". The acquired power level of the return light signal as a function of time is referred to as an "OTDR trace" or a "reflectometric trace", where the time scale is representative of distance between the OTDR acquisition device and a point along the fiber link.

In the following description, techniques that are generally known to one skilled in the art of OTDR measurement and OTDR trace processing and analysis will not be explained or detailed and in this respect, the reader is referred to available literature in the art. Such techniques that are considered to be known include, e.g., signal processing methods for identifying and characterizing events from an OTDR trace and bidirectional OTDR analysis.

Each OTDR acquisition is understood to refer to the actions of propagating a test signal comprising one or more test light pulses having the same pulse width in the optical fiber link, and detecting corresponding return light signal from the optical fiber link as a function of time. A test light-pulse signal travelling along the optical fiber link will return towards its point of origin either through (distributed) backscattering or (localized) reflections. The acquired power level of the return light signal as a function of time is referred to as the OTDR trace, where the time scale is representative of distance between the OTDR acquisition device and a point along the optical fiber link. Light acquisitions may be repeated with varied pulse width values to produce a separate OTDR trace for each test pulse width.

One skilled in the art will readily understand that in the context of OTDR methods and systems, each light acquisition generally involves propagating a large number of substantially identical light pulses in the optical fiber link and averaging the results. In this case, the result obtained from averaging will herein be referred to as an OTDR trace. It will also be understood that other factors may need to be controlled during the light acquisitions or from one light acquisition to the next, such as gain settings, pulse power, etc. as is well known to those skilled in the art.

"Backscattering" refers to Rayleigh scattering occurring from the interaction of the travelling light with the optical fiber media all along the fiber link, resulting in a generally sloped background light (in logarithmic units, i.e. dB, on the ordinate) on the OTDR trace, whose intensity disappears at the end of the range of the travelling pulse. "Events" along the fiber will generally result in a more localized drop of the backscattered light on the OTDR trace, which is attributable to a localized loss, and/or in a localized reflection peak. It will be understood that an "event" characterized by the OTDR method described herein may be generated by any perturbation along the fiber link which affects the returning light. Typically, an event may be generated by an optical fiber splice along the fiber link, which is characterized by a localized loss with little or no reflection. Mating connectors can also generate events that typically present reflectance, although these may be impossible to detect in some instances. OTDR methods and systems may also provide for the identification of events such as a fiber breakage, characterized by substantial localized loss and, frequently, a concomitant reflection peak, as well as loss resulting from a bend in the fiber. Finally, any other component along the fiber link may also be manifest as an "event" generating localized loss.

Figure 2:
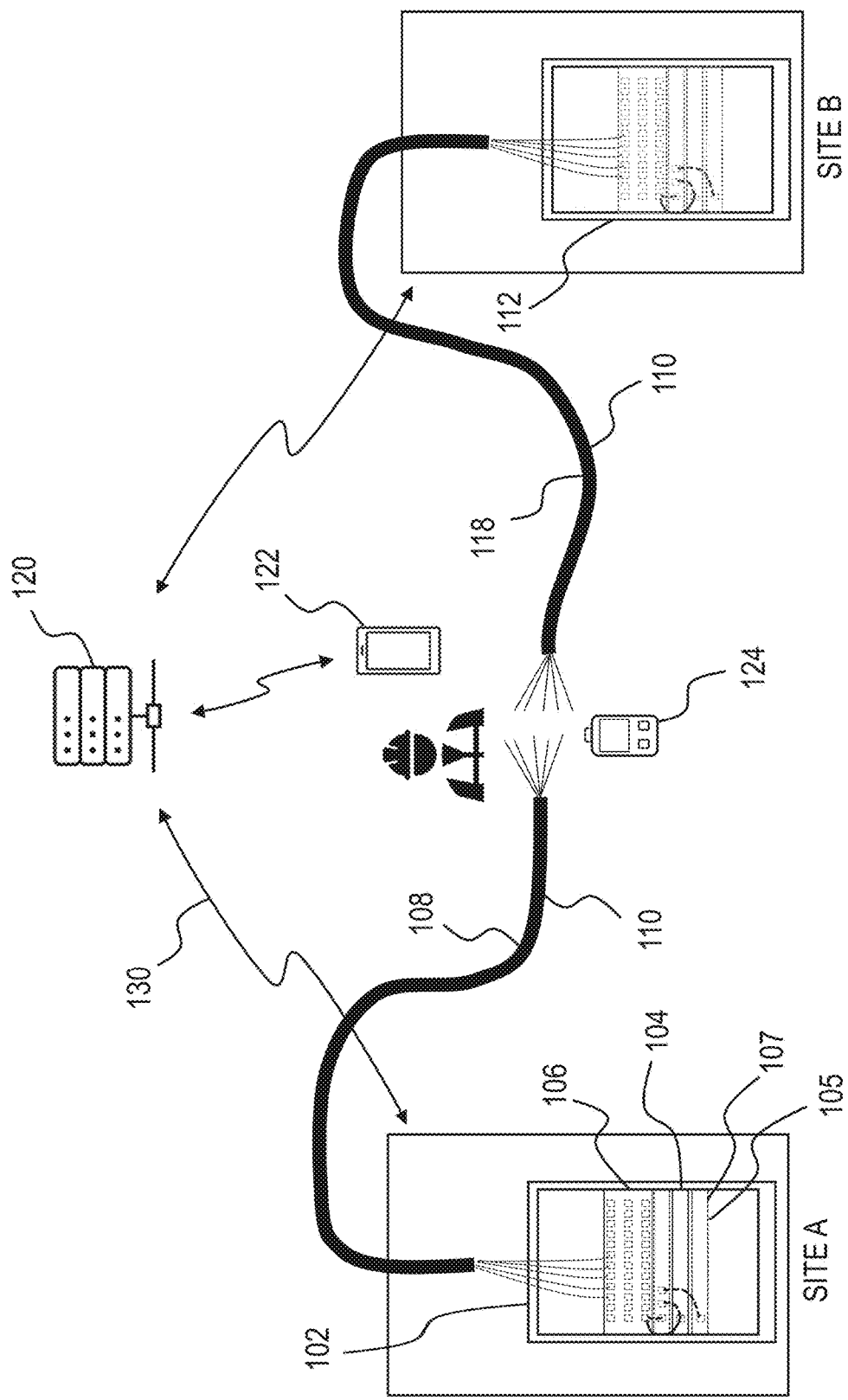
FIG. 2 is a schematic illustrating test system for assisting a splicing technician in optical fiber splices, in accordance with one embodiment.

Now referring to the drawings, FIG. 2 shows a test system for assisting a splicing technician in optical fiber splices, in accordance with one embodiment. The test system comprises: a first remote test unit 102 and a second remote test unit 112 (also referred to herein as RTUs) to be connected toward opposite ends of an optical fiber link to be spliced which comprises a first fiber span 108 and a second fiber span 118 to be spliced to one another. RTUs 102 and 112 are respectively located at site A and site B.

Each remote test unit 102, 112 has at least one output port and comprises an OTDR acquisition device 104 for performing OTDR acquisitions toward its output port in order to test a quality of the splice. Each remote test unit 102, 112 further comprises a tone generator 105 to produce a tone optical signal (such as a 1-kHz or 2-kHz modulated light) toward the output port, and a tone detector 107 to detect a presence of a tone signal produced by the tone generator 105 of the opposite test unit and received via the output port, in order to test a continuity of the optical fiber link. It is noted that in some embodiments, the tone generator 105 may be implemented using the light source of the OTDR acquisition device 104 and the tone detector 107 be implemented using the optical detector of the OTDR acquisition device 104. Alternatively, a distinct light source and/or a distinct optical detector may be used for tone generation and detection. In one embodiment, the tone generator 105 produces a frequency-modulated tone signal, but other types of modulation may be used to encode the tone signal such as, e.g., a coded amplitude modulation.

In the context of multi-fiber links, each remote test unit 102, 112 may comprise a plurality of output ports and an optical switch 106 to connect the OTDR acquisition device 104, the tone generator and the tone detector toward a selected one of the output ports, in order to assist the technician in performing a splice along the optical fiber link connected to the selected output port.

The test system further involves a wireless portable device 122 used by the splicing technician, such as a smart phone, a smart tablet or any other portable computer device, and which is in wireless communication with both remote test units 102, 112, either directly or indirectly (e.g., through a network server application). The portable device 122 runs a test application which comprises a user interface to display results of continuity tests and splice quality tests performed by remote test units 102, 112 on a display screen of the wireless portable device 122. The user interface may further comprise various user inputs, e.g., for the technician to trigger one or both the test units to launch continuity or splice quality tests.

The test system may further comprise an optional handheld tone detector 124 to be connected, at a splice location, to one of the first fiber span and the second fiber span, in order for the splicing technician to identify the proper fiber spans to be spliced together from the presence of a tone signal propagating in the fiber spans (and emitted by the remote test unit 102 or 112 connected at the other end of the fiber span). The tone detector 124 can detect tone signals (such as a 1-kHz or 2-kHz modulated light) out of a cut fiber without any connector, e.g., using a bare fiber adaptor. Optionally, the tone detector 124 may include a spectral filter or a digital filter to filter out any OTDR signal present on the fiber, so the tone generator and detector can be used concurrently with OTDR acquisitions, so link continuity and splice quality testing can be conducted concurrently.

It is noted that, in some embodiments, the RTUs 102, 112 may be embodied as fixed test units (such as, e.g., rack mount units). For example, they may be included, e.g., in fiber monitoring test equipment. In other embodiments, either or both RTUs 102, 112 may be embodied as a portable test instrument. Furthermore, if optical fibers are to be spliced on site A or site B, the corresponding RTU 102 or 112 may also serve as the wireless portable device 122 (i.e., the RTU and the wireless portable device are integrated together in one and the same portable unit comprising an OTDR acquisition device and running the test application).

The embodiment of FIG. 2 further comprises an optional network server 120 to provide storage, services and test orchestration via wireless communication 130 between the network server 120 and the wireless portable device 122 and remote test units 102, 112. In this case, among other things, the network server 120 serves as a communication bridge between the wireless portable device 122 and the remote test units 102, 112 and runs a test orchestration application. It is noted that in other embodiments, functions of storage, services and test orchestration may alternatively be implemented in a test orchestration application running on one or both remote test units 102, 112 or in the wireless portable device 122.

The test orchestrator application may comprise one or more of the following functionalities:
Registration and selection of remote test units in order to initiate tests on the proper remote test units;
Edition interface and storage of the mapping between the multiple output ports of optical switches 106 and identifiers associated with optical fibers of the cables to be tested;
Provide a list of optical fibers to be spliced and tested to the portable device 122;
Orchestrate a calibration step for the remote test unit(s) 102, 112 to detect a position of the end of fiber span to be spliced, and record this calibration in server storage;
Receive a command from the portable device 122 to launch a test on a specific fiber, then communicate with remote test unit(s) 102, 112 so as to select the corresponding port on the optical switch 106, activate the tone generator and optionally configure the tone modulation frequencies (e.g., 1 kHz or 2 kHz) so they are not the same on the two remote test units 102, 112;
Receive continuity test results from one or both remote test units 102, 112 and stream the same to the test application running on the portable device 122;
Monitor results of continuity tests performed by a remote test unit 102, 112 and splice completion detection (e.g., based on stable power level of the tone signal, stable splice loss, low splice loss and/or low reflectance); and optionally stream the splice completion detection status to the test application running on the portable device 122;
Based upon splice completion detection, automatically trigger one or both remote test units 102, 112 (e.g., one at a time) to launch a splice quality test (optionally, OTDR acquisitions may be conducted from both remote test units in order to obtain a bi-directional OTDR measurement of the splice loss);
Receive a command from the portable device 122 to launch a splice quality test and stream the request to one or both remote test units 102, 112 (e.g., one at a time); and optionally request the remote test units 102, 112 to turn off their respective tone generator before launching a splice quality test;
Stream splice quality test results to the test application running on the portable device 122 for user display;
Store continuity and/or splice quality test results for each spliced fiber for reporting.

The test application running on the portable device 122 may comprise one or more of the following functionalities:
Launch a calibration step to detect a position of the end of the fiber span to be spliced;
In the user interface, display a list of fiber identifiers associated with optical fibers of a cable to be repaired, e.g., using the color coding of the fiber cable;
Via the user interface, receive a user selection of the optical switch port or fiber identifier of the fiber span to be spliced and stream the same to the test orchestrator application, so as to trigger the optical switch 106 to select the corresponding port on the optical switch 106 and activate the tone generator;
Send a command to the test orchestrator application to launch a splice quality test on a specific fiber;
Receive continuity and splice quality test results from the test orchestrator application;
Display continuity and splice quality test results to the user and optionally continuously refresh the display as new results are continuously received;
Output error messages to the user in case no continuity is detected after splicing;
Apply pass/fail thresholds to splice quality test results, e.g., by applying thresholds to splice loss measurements;
Output error messages to the user in case the tested splice fails the splice quality test;
In some embodiments, the remote test units 102, 112 may perform continuity testing and splice quality testing concurrently and the tests be repeated continuously. The test orchestrator application may then continuously stream results to the test application running on the portable device 122 and the test application may continuously receive results and refresh the user display accordingly.

Figure 3:
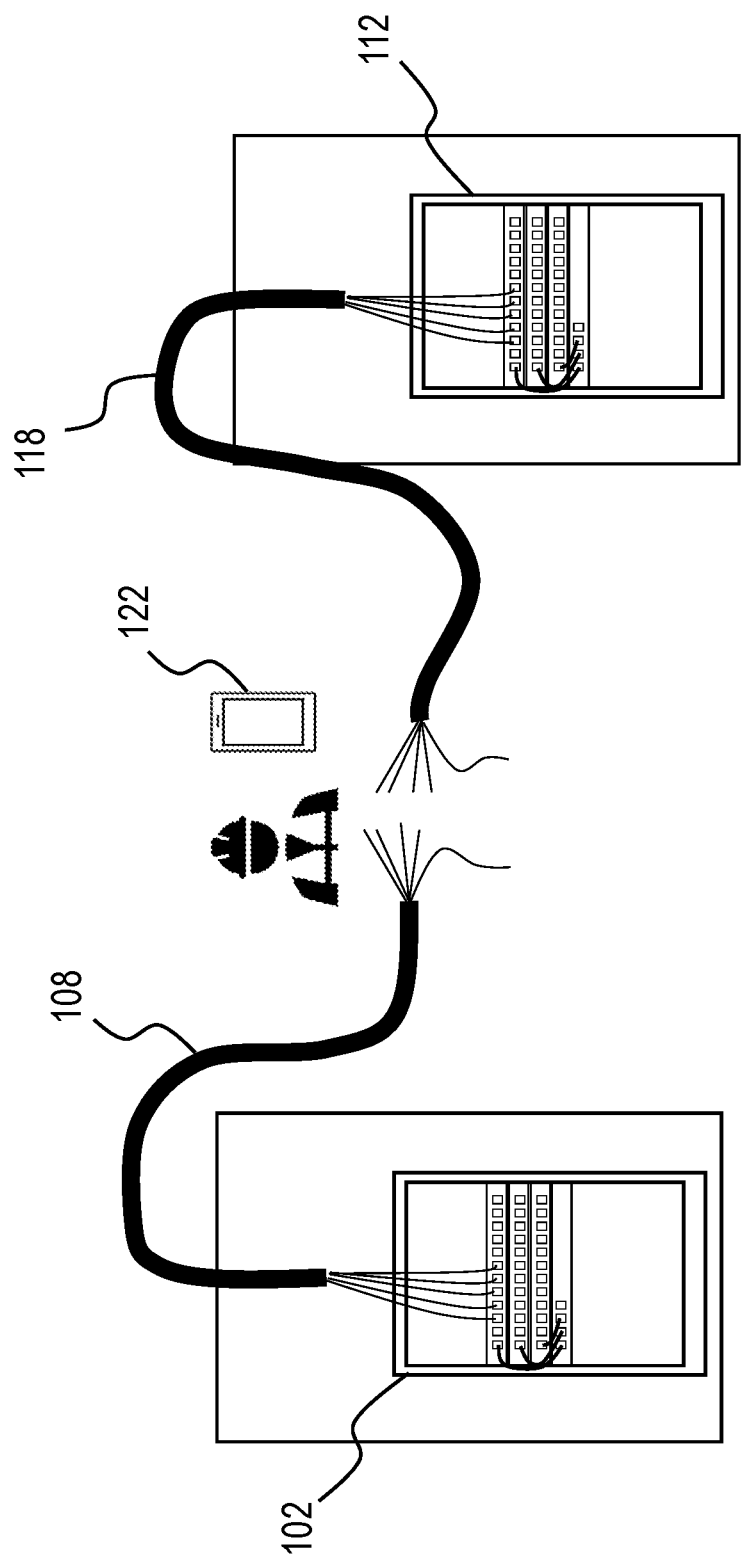
FIG. 3 is a schematic illustrating a preliminary calibration step of a method for assisting a technician in optical fiber splices, in accordance with one embodiment.

System Preparation and Calibration:

FIG. 3 is a schematic illustrating a preliminary system preparation and calibration step of a method for assisting a technician in optical fiber splices, in accordance with one embodiment.

The calibration step may be performed prior to splice quality testing in order to find locations of the end of each fiber spans to be spliced relative to the remote test units 102, 112. This location may be used to locate the splice in subsequent OTDR acquisitions obtained once the splice is completed, and then allow to measure the splice loss therefrom. Values of locations of the end of the fiber spans are obtained from OTDR measurements performed by the RTUs 102, 112 and may be recorded in the server storage accessible by the test orchestrator application.

Figure 4:
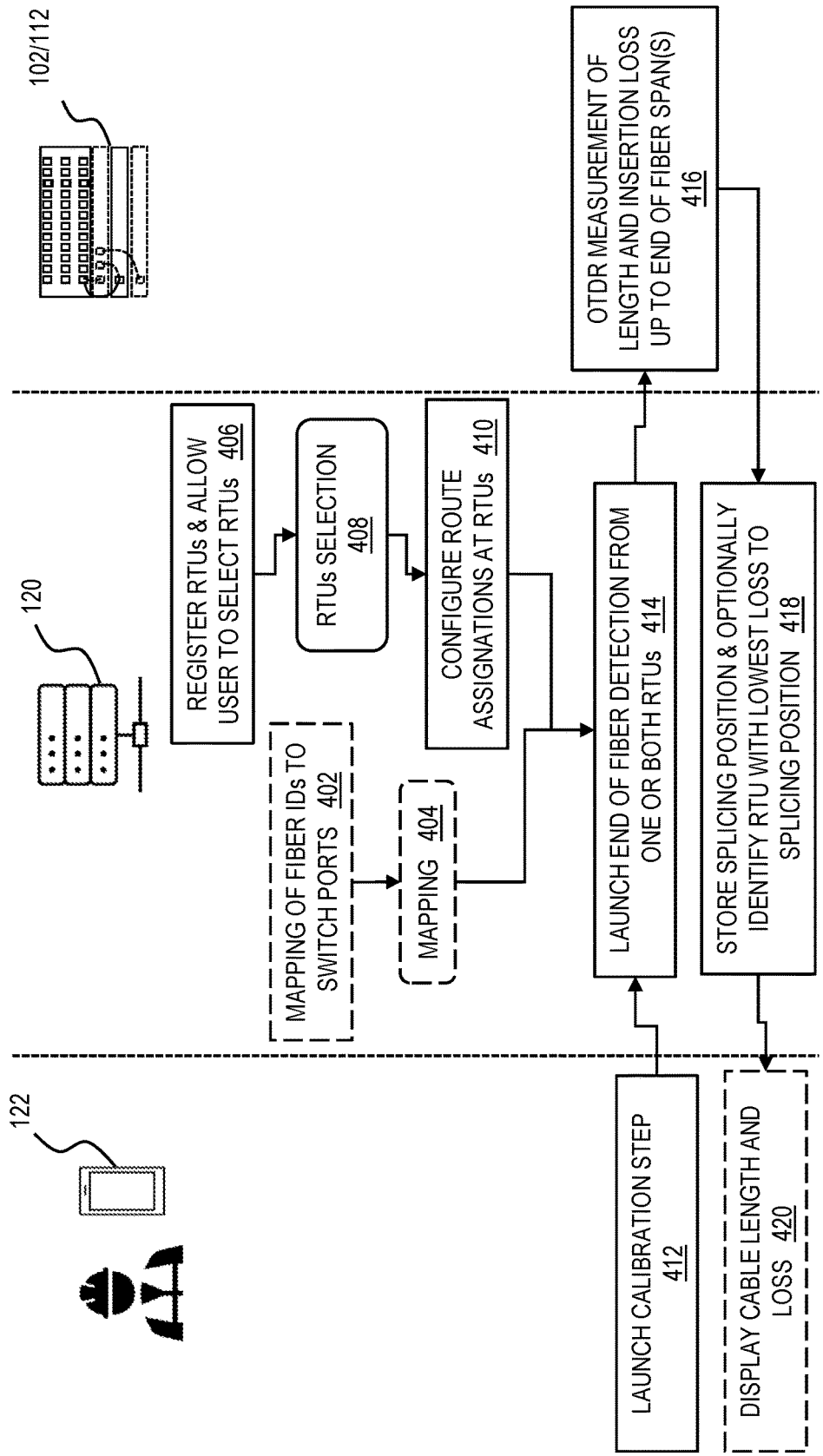
FIG. 4 is a flowchart illustrating the preliminary calibration step of a method for assisting a technician in optical fiber splices, in accordance with one embodiment.

FIG. 4 is a flowchart illustrating the preliminary system preparation including the calibration step which may be performed in preparation for a method for assisting a technician in optical fiber splices, in accordance with one embodiment.

In order to perform the system preparation and calibration step, the system is first connected as illustrated in FIG. 3, i.e., each optical fiber to be spliced is connected to remote test units 102, 112. In the case of a fiber optic cable comprising a plurality of optical fibers, each optical fiber is connected to one output port of the optical switch 106 of the corresponding RTU 102, 112.

In the embodiment illustrated in FIGS. 3 and 4, some steps of the preliminary system preparation are performed by the test orchestrator server-based application. It is however noted that in other embodiments, such steps may be performed by a test orchestration application running on one or both remote test units 102, 112 or in the wireless portable device 122.

Create Routes:

In step 402, a configuration interface may be provided to configure mappings 404 between fibers identifiers and output ports of the optical switches 106. The configuration interface may be accessed by the user, e.g., via a browser that connects to the network server 120 which runs the test orchestrator application.

Using the configuration interface, the user may configure on the server 120, a number of optical routes that corresponds to the number of optical fibers to be repaired in the cable 108. For example, the names of the routes may correspond to circuit identifiers used in both sites to identify a specific link. The optical routes may be bundled together using a tag, a job ID, a cable ID or any other equivalent, allowing the user to easily go to the next optical fiber link during cable repair and easily report all test results at once.

Assign RTU Ports:

In step 406, the server-based application connects to and registers RTUs 102,112 and allows the user to make a selection 408 as to the RTUs 102, 112 to be used in the splice process among potential other RTUs registered with the test orchestrator application.

In step 410, the configuration interface may further allow the user to configure the assignation of the optical routes to output ports of the optical switches 106. For simplicity, the same configuration may optionally be applied to both RTUs 102, 112.

The user then connects each end of the cable 108 to be repaired to one RTU 102, 112.

Calibrate Cable Segments:

In step 412, using its portable device 122, the user selects the optical routes for testing (using the bundling tag, for instance), and triggers the calibration step to find locations of the end of the fiber span(s) to be spliced relative to the remote test units 102, 112. In step 414, the test orchestrator application launches OTDR acquisitions from one or both RTUs 102 and 112 to find the end of the fiber span(s) and derive the fiber length and insertion loss of the cable segments 108 and 118 up to the future splice.

In step 416, values of optical length and insertion loss up to the splice are obtained from OTDR measurements performed by the RTUs 102, 112 and may be recorded in the server storage accessible by the test orchestrator application. In one embodiment, it is assumed that all routes return the same calibration length and similar losses and the calibration measurement is conducted on a single selected optical route.

The calibration measurement can be performed from either a single one or both RTUs 102, 112. In some embodiments, the calibration measurement is performed from both RTUs 102, 112, which allows the test orchestrator application to determine which RTU is connected to the fiber span showing the lower insertion loss up to the splice location, an information that can be used for later splice quality testing.

In step 418, the thereby obtained values of optical length and insertion loss up to the splice are recorded in the server storage accessible by the test orchestrator application.

In step 420, the user interface of the portable device 122 may optionally display the obtained values of optical length and insertion loss to the user.

Once calibration is completed, the user is ready to repair and test the cable. Now referring to FIGS. 5, 6, 7A and 7B, there is described such a method for assisting a technician in optical fiber splices, in accordance with one embodiment.

Figure 7A:
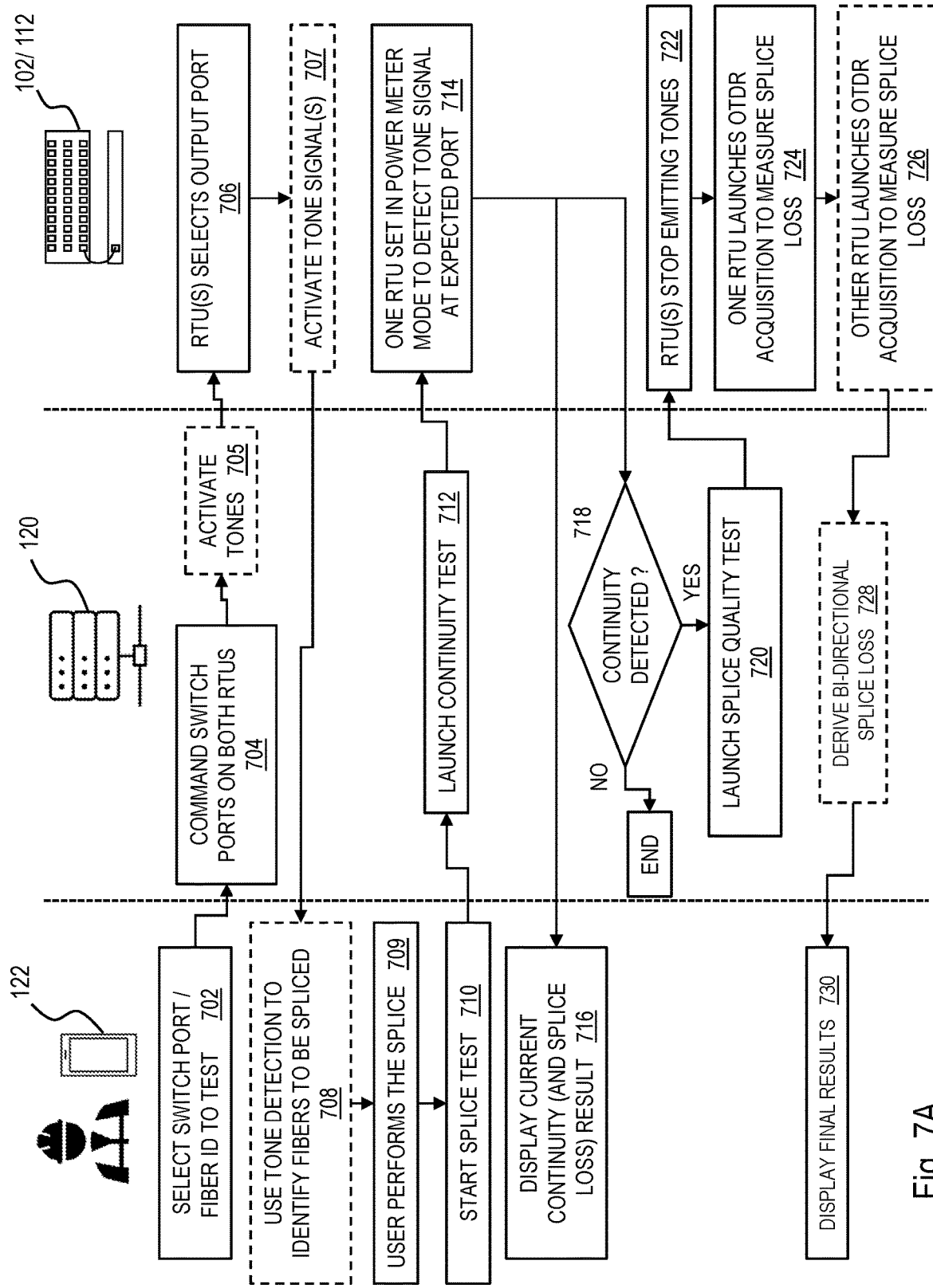
FIG. 7A is a flowchart illustrating a method for assisting a technician in optical fiber splices, in accordance with one embodiment.
Figure 7B:
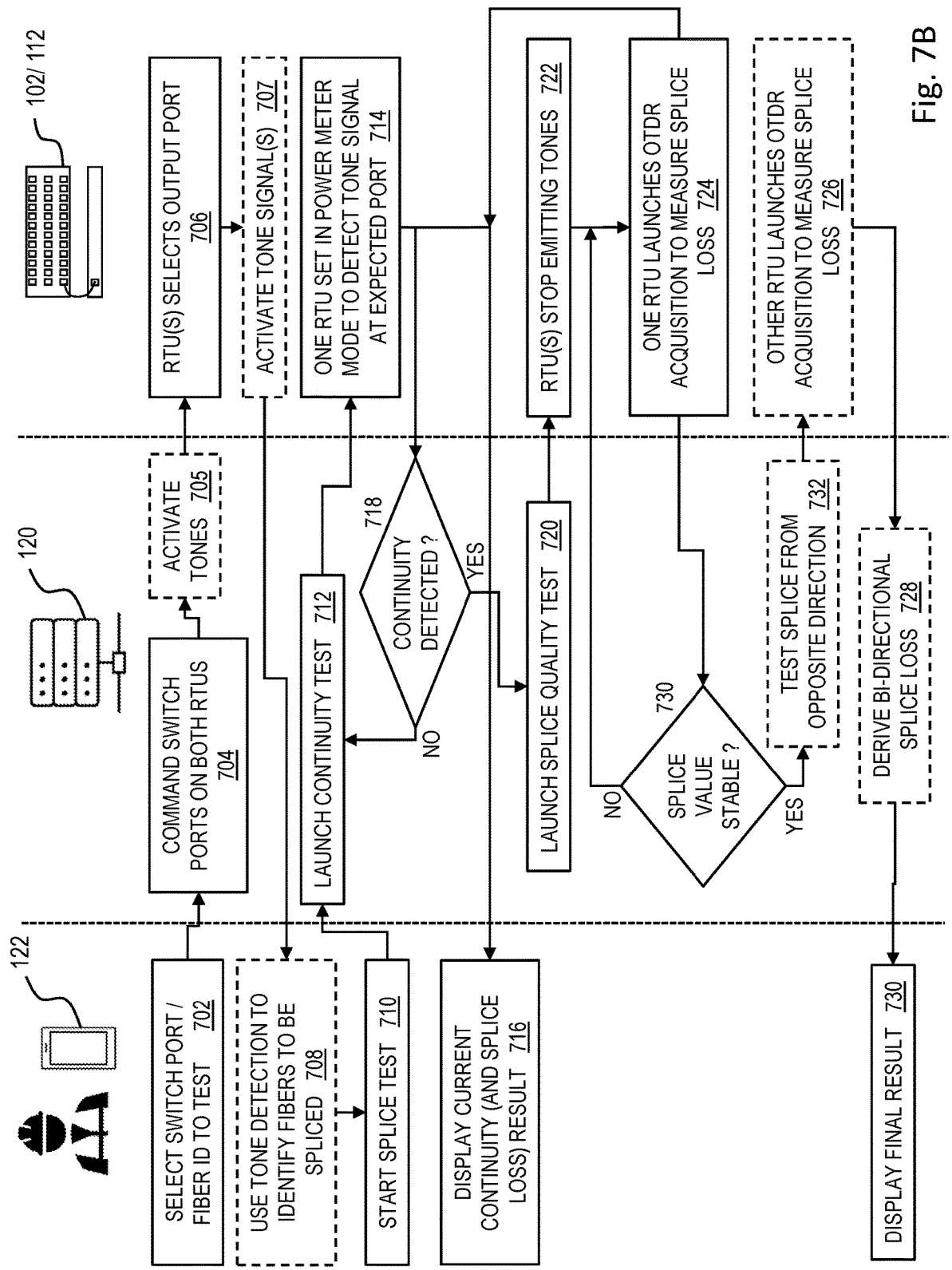
FIG. 7B is a flowchart illustrating a method for assisting a technician in optical fiber splices, in accordance with another embodiment which includes some further automation.

FIGS. 7A and 7B illustrate methods for assisting a technician in optical fiber splices, in accordance with different embodiments, where the embodiment of FIG. 7B includes some further automation. Some of the steps for the methods of FIGS. 7A and 7B are the same and will therefore not be repeatedly described.

Step 1—Identify Fibers with Tone Detection (Optional)

Figure 5:
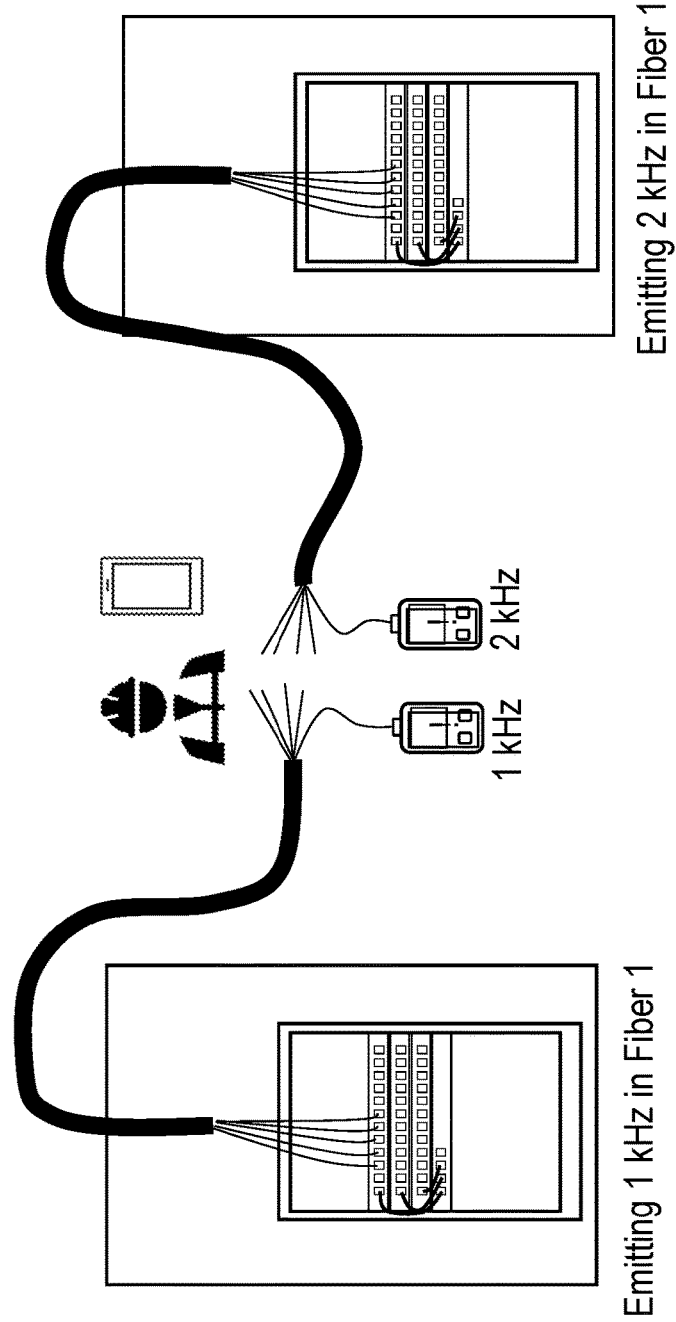
FIG. 5 is a schematic illustrating a step of identifying fibers, which is part of a method for assisting a technician in optical fiber splices, in accordance with one embodiment.

FIG. 5 illustrates a step 1 of identifying fibers using tone detection, which is an optional step of the method that may be performed if the user needs to find or verify the fibers to be spliced among a plurality of fibers within a cable.

Now referring to FIGS. 7A and 7B, in step 702, via the user interface of the portable device 122, the user selects an optical fiber to repair and triggers the tone mode. The selection may be made, e.g., by selecting ports of the optical switches or circuit identifiers as configured in the preliminary system preparation. In step 704, from this trigger, the test orchestrator application commands both RTUs 102, 112 to switch ports. In step 705, which is optional, the test orchestrator application triggers at least one RTU to activate its tone source mode to start emitting a tone signal. In step 706, both RTUs 102, 112 switch ports. In optional step 707, in response to step 705, at least one RTU activates its tone source mode to start emitting a tone signal. In some embodiments, RTU 102 and RTU 112 may use different tone frequencies in order to allow identification of a signal coming from site A vs site B (e.g., 270 Hz, 330 Hz, 1 kHz or 2 kHz). In other embodiments, the same frequency may be used.

In step 708, if a hand-held tone detector 124 is used, the user can optionally confirm which are the two fibers to be spliced together, i.e., those on which tones are detected.

In step 709, the user can now splice the fibers.

Step 2—Test Splice and Continuity

Figure 6:
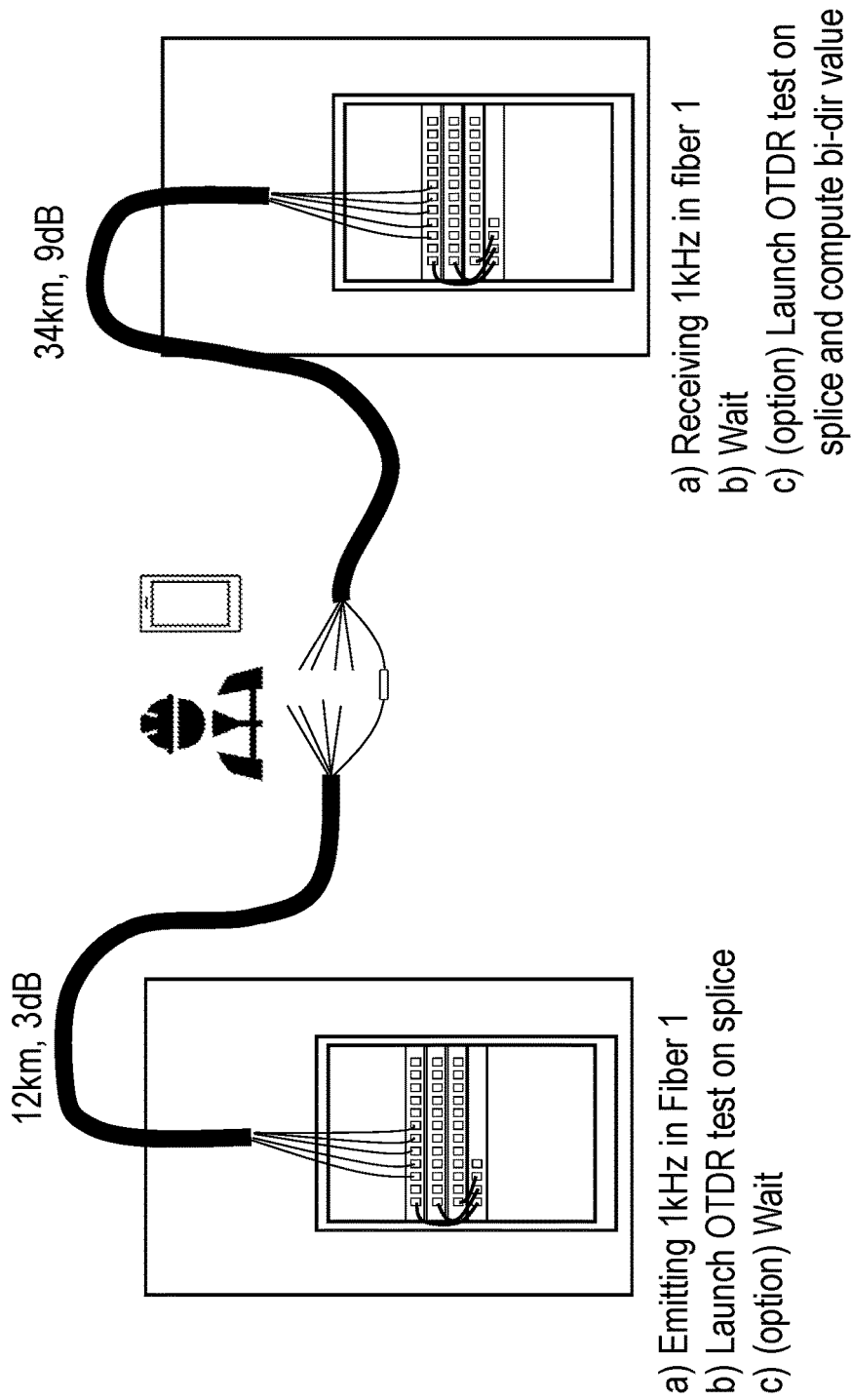
FIG. 6 is a schematic illustrating a step of testing splices, which is part of a method for assisting a technician in optical fiber splices, in accordance with one embodiment.

FIG. 6 illustrates a step of testing splices and continuity, in accordance with one embodiment. Referring to FIGS. 7A and 7B, in step 710, once the splice is completed, the user launches the splice quality test via the portable device 122. Then, in step 712, the test orchestrator application stops the tone mode, and launches a continuity test. In step 714, one RTU continues to inject a tone signal in one end of the cable, while the RTU at opposite end use its tone detector to detect presence or absence of the tone on the expected optical port.

In step 716, results of the continuity test are relayed by the test orchestrator application to the portable device 122 for user display and continuity test results are displayed to the user. If no tone signal is detected, then, the user interface displays an error message such as, e.g., "Fiber continuity failed". Optionally, if no tone is detected on the expected port, the RTU that is in power meter mode can scan through all connected ports to find presence of tone on another fiber and record a correspondence between optical switch ports on both sides of the cable. If a tone signal is detected, then link continuity is confirmed.

In step 718, if a tone signal is detected, then, in 720, link continuity is confirmed, and the test orchestrator application may automatically launch a splice quality test.

Splice quality testing goes as follows: in step 722 the RTUs 102, 112 stop emitting the tones. Then, in step 724, one of the RTUs launches OTDR acquisition(s) to measure the splice loss. Optionally, OTDR acquisition(s) is(are) performed by the RTU that is the closest to the expected splice. Or more precisely, the RTU for which the insertion loss up to the splice location is the lowest (according to values obtained and recorded during preliminary system preparation).

Optionally, a bidirectional OTDR measurement may be obtained by performing OTDR acquisitions from both ends of the optical fiber link. In such case, in step 726, OTDR acquisition(s) is(are) also launched from the other RTU in order to derive the splice loss from a bi-directional OTDR analysis.

It is noted that bi-directional OTDR analysis advantageously allows to mitigate any loss measurement bias that may be due to varying backscattering characteristics of optical fibers along the optical fiber link. In step 728, a bi-directional OTDR analysis may average the results of single-ended OTDR measurements performed via opposite ends of an optical fiber link to derive a bi-directional splice loss value.

Step 3—Results

In step 730, results of the splice quality test, e.g., including splice loss value, are displayed to the user via the user interface on the portable device. Optionally, the user interface may indicate PASS/FAIL results, based on the continuity test and the splice loss value. For example, PASS/FAIL results may be derived by comparing the splice loss value to a PASS/FAIL threshold. The result may be synchronized and displayed on the user's portable device.

Step 4—Capture Results

Once the splice quality test is completed, the user may trigger a capture of the test results. The system then records the splice quality test results for the current fiber that was spliced.

Step 5—go to Next Fiber

Once the splice is completed and tested, in step 702, the user selects a next fiber link to be spliced and the process is repeated until all fibers are spliced.

The method of FIG. 7B includes some variations compared to the method of FIG. 7A. These variations will now be described with reference to FIG. 7B. Some steps of the method of FIG. 7B are equivalent to steps of the method of FIG. 7A and are therefore not repeatedly described.

Step 1—Identify Fibers with Tone Detection (Optional)

Steps 702, 704, 705, 706, 707 and 708 described with reference to FIG. 7A are not repeatedly described.

Step 2—Test Splice and Continuity

In the method of FIG. 7B, continuity and splice quality are continuously repeated to continuously re-assess the splice and provide continuous feedback to the user. The system therefore does not wait for the splice to be completed to perform splice quality testing.

In step 710, before the splice is performed, the user launches the splice test process via the portable device 122 and can now perform the splice.

Meanwhile, in step 712, the test orchestrator application stops the tone mode, and launches a continuity test. In step 714, one RTU continues to inject a tone signal in one end of the cable, while the RTU at opposite end use its tone detector to detect presence or absence of the tone on the expected optical port.

In step 716, results of the continuity test are relayed by the test orchestrator application to the portable device 122 for user display. No splice loss result is yet available for display but can be displayed when available.

In step 718, if no tone signal is detected, then there is no continuity yet and continuity testing is repeated. When a tone signal is detected, then link continuity is confirmed and then, in step 720, the test orchestrator application may automatically launch a splice quality test.

Splice quality testing goes as follows: in step 722 the RTUs 102, 112 stop emitting the tones. Then, in step 724, one of the RTUs launches OTDR acquisition(s) to measure the splice loss and thereby monitor splice completion. Updated continuity result and splice loss value are streamed by the test orchestrator application to the portable device 122 which are continuously updated on user interface of the portable device while the splice may be ongoing (step 716).

Here, completion of the splice process is automatically detected by monitoring the splice loss value. Once the splice loss is found to be stable, it is determined that the splice is completed. Therefore, in step 730, if the splice loss value is not found to be stable, OTDR acquisitions are repeated in step 724. Otherwise, the splice is considered to be completed.

Optionally, a bidirectional OTDR measurement may be obtained by performing OTDR acquisitions from the other end of the optical fiber link. In such case, in step 732, the test orchestrator application may automatically trigger the launch of a splice quality test in the other direction. In step 726, OTDR acquisition(s) is(are) launched from the other RTU in order to derive the splice loss from a bi-directional OTDR analysis. In step 728, a bi-directional OTDR analysis may average the results of single-ended OTDR measurements performed via opposite ends of an optical fiber link to derive a bi-directional splice loss value.

Step 3—Results

In step 730, the splice loss value is displayed to the user via the user interface on the portable device.

Step 4—Capture Results

In some embodiments, splice quality testing may be continuously repeated until a trigger is received by the user to stop the process.

Once the splice is completed and the user is satisfied with the current results being displayed, the user may trigger a capture of the test results. The system then records the splice quality test results for the current fiber that was spliced.

Step 5—go to Next Fiber

Then, in step 702, the user selects a next fiber link to be spliced and the process is repeated until all fibers are spliced.

Example of Computer System Architecture

Figure 8:
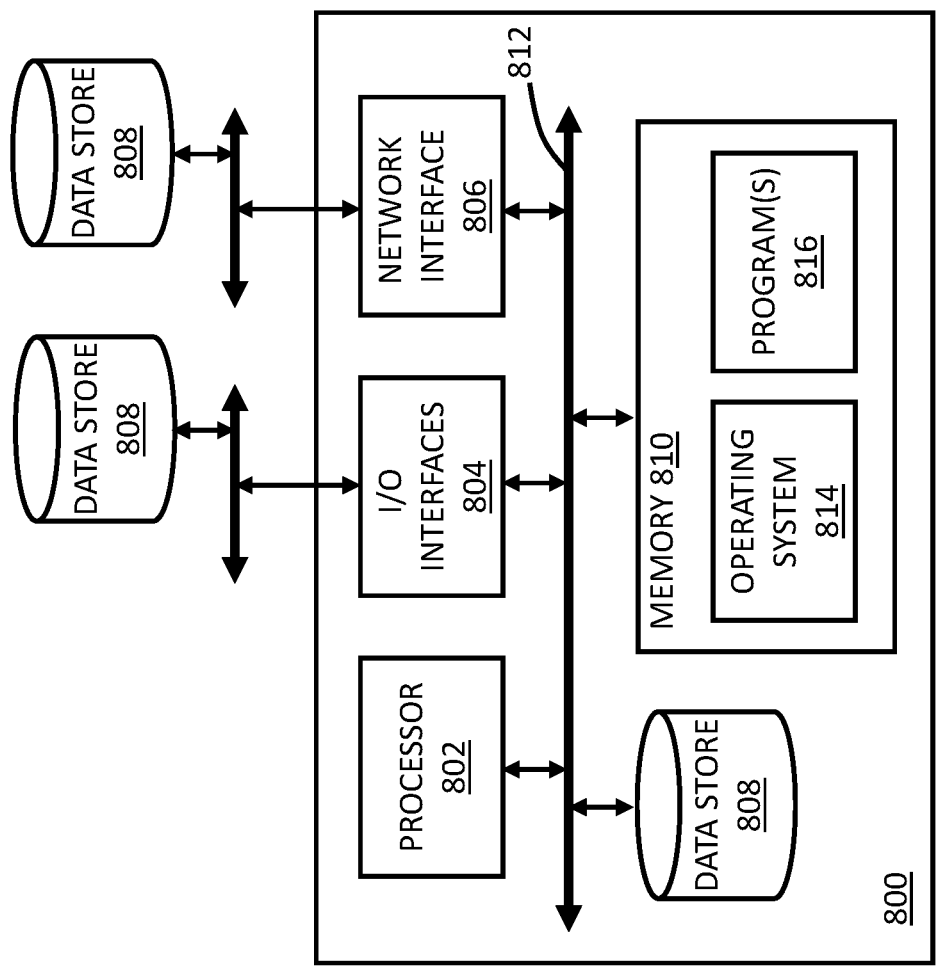
FIG. 8 is a block diagram illustrating an example architecture of a computer system embodying the server used to implement the server-based system of FIG. 2, in accordance with one embodiment.

Much of the software application that is used to implement the herein-described methods resides on and runs on a computer system, which in one embodiment, is a personal computer, workstation, or server. FIG. 8 is a block diagram of a computer system 800 which may embody, e.g., the server 120 used to implement the server-based system of FIG. 2. In terms of hardware architecture, the computer system 800 generally includes a processor 802, input/output (I/O) interfaces 804, a network interface 806, a data store 808, and memory 810. It should be appreciated by those of ordinary skill in the art that FIG. 8 depicts the computer system 800 in a simplified manner, and a practical embodiment may include additional components and suitably configured processing logic to support known or conventional operating features that are not described in detail herein. A local interface 812 interconnects the major components. The local interface 812 may be, for example, but not limited to, one or more buses or other wired or wireless connections, as is known in the art. The local interface 812 may have additional elements, which are omitted for simplicity, such as controllers, buffers (caches), drivers, repeaters, and receivers, among many others, to enable communications. Further, the local interface 812 may include address, control, and/or data connections to enable appropriate communications among the aforementioned components.

The computer system 800 is controlled by the processor 802, which serves as the central processing unit (CPU) for the system. The processor 802 is a hardware device for executing software instructions. The processor 802 may comprise one or more processors, including central processing unit(s) (CPU), auxiliary processor(s) or generally any device for executing software instructions. When the computer system 800 is in operation, the processor 802 is configured to execute software stored within the memory 810, to communicate data to and from the memory 810, and to generally control operations of the computer system 800 pursuant to the software instructions. The I/O interfaces 804 may be used to receive user input from and/or for providing system output to one or more devices or components. The user input may be provided via, for example, a keyboard, touchpad, and/or a mouse. System output may be provided via a display device and a printer (not shown). I/O interfaces 804 may include, for example, a serial port, a parallel port, a Small Computer System Interface (SCSI), a Serial ATA (SATA), a fibre channel, Infiniband, iSCSI, a PCI Express interface (PCI-x), an Infrared (IR) interface, a Radio Frequency (RF) interface, a Universal Serial Bus (USB) interface, or the like.

The network interface 806 may be used to enable the computer system 800 to communicate over a computer network or the Internet. The network interface 806 may include, for example, an Ethernet card or adapter or a Wireless Local Area Network (WLAN) card or adapter. The network interface 806 may include address, control, and/or data connections to enable appropriate communications on the network. A data store 808 may be used to store data. The data store 808 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 808 may incorporate electronic, magnetic, optical, and/or other types of storage media. In one example, the data store 808 may be located internal to the computer system 800 such as, for example, an internal hard drive connected to the local interface 812 in the computer system 800. Additionally, in another embodiment, the data store 808 may be located external to the computer system 800 such as, for example, an external hard drive connected to the I/O interfaces 804 (e.g., SCSI or USB connection). In a further embodiment, the data store 808 may be connected to the computer system 800 through a network, such as, for example, a network attached file server.

The memory 810 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 810 may incorporate electronic, magnetic, optical, and/or other types of storage media. Note that the memory 810 may have a distributed architecture, where various components are situated remotely from one another, but can be accessed by the processor 802. The software in memory 810 may include one or more computer programs, each of which includes an ordered listing of executable instructions for implementing logical functions. The software in the memory 810 includes a suitable operating system (O/S) 814 and one or more computer programs 816. The operating system 814 essentially controls the execution of other computer programs, such as the one or more programs 816, and provides scheduling, input-output control, file and data management, memory management, and communication control and related services. The one or more programs 816 may be configured to implement the various processes, algorithms, methods, techniques, etc. described herein, such as duplicate OTDR measurement detection.

It should be noted that the architecture of the computer system as shown in FIG. 8 is meant as an illustrative example only. Numerous types of computer systems are available and can be used to implement the computer system.

Example of OTDR Device Architecture

Figure 9:
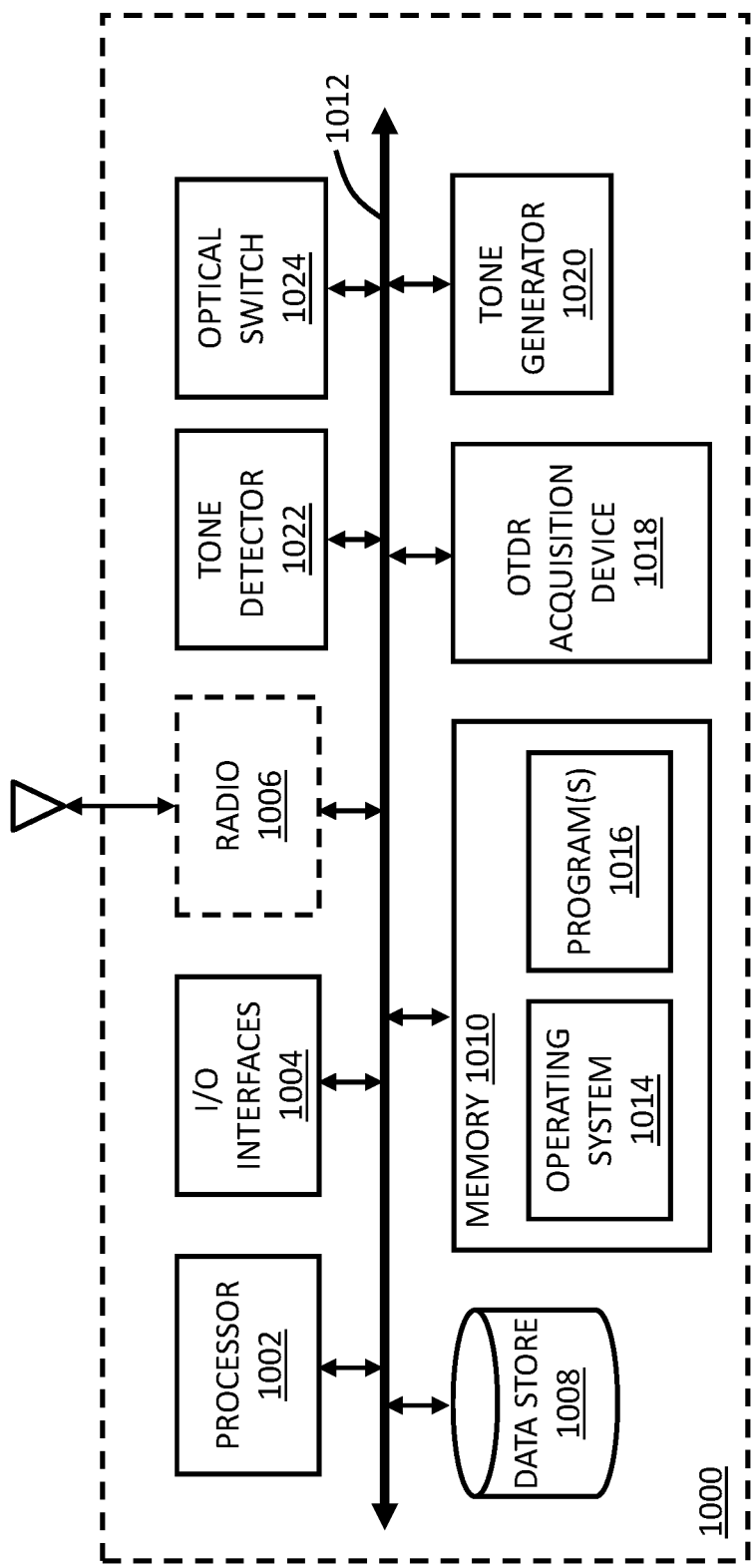
FIG. 9 is a block diagram illustrating an example architecture of a test unit of the test system of FIG. 2.

FIG. 9 is a block diagram of a test device 1000 which may embody the remote test units 102, 112 of the system of FIG. 2. The test device 1000 may comprise a digital device that, in terms of hardware architecture, generally includes a processor 1002, input/output (I/O) interfaces 1004, an optional radio 1006, a data store 1008, a memory 1010, as well as optical test devices including an OTDR acquisition device 1018, a tone generator 1020, a tone detector 1022 and an optical switch 1024. It should be appreciated by those of ordinary skill in the art that FIG. 9 depicts the test device 1000 in a simplified manner, and a practical embodiment may include additional components and suitably configured processing logic to support known or conventional operating features that are not described in detail herein. A local interface 1012 interconnects the major components. The local interface 1012 can be, for example, but not limited to, one or more buses or other wired or wireless connections, as is known in the art. The local interface 1012 can have additional elements, which are omitted for simplicity, such as controllers, buffers (caches), drivers, repeaters, and receivers, among many others, to enable communications. Further, the local interface 1012 may include address, control, and/or data connections to enable appropriate communications among the aforementioned components.

The processor 1002 is a hardware device for executing software instructions. The processor 1002 may comprise one or more processors, including central processing units (CPU), auxiliary processor(s) or generally any device for executing software instructions. When the test device 1000 is in operation, the processor 1002 is configured to execute software stored within the memory 1010, to communicate data to and from the memory 1010, and to generally control operations of the test device 1000 pursuant to the software instructions. In an embodiment, the processor 1002 may include an optimized mobile processor such as optimized for power consumption and mobile applications. The I/O interfaces 1004 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like, via one or more LEDs or a set of LEDs, or via one or more buzzer or beepers, etc. The I/O interfaces 1004 can be used to display a graphical user interface (GUI) that enables a user to interact with the test device 1000 and/or output at least one of the values derived by the OTDR analyzing module.

The radio 1006, if included, may enable wireless communication to an external access device or network. Any number of suitable wireless data communication protocols, techniques, or methodologies can be supported by the radio 1006, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); NarrowBand Internet of Things (NB-IoT); Long Term Evolution Machine Type Communication (LTE-M); magnetic induction; satellite data communication protocols; and any other protocols for wireless communication. The data store 1008 may be used to store data, such as OTDR traces and OTDR measurement data files. The data store 1008 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1008 may incorporate electronic, magnetic, optical, and/or other types of storage media.

The memory 1010 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 1010 may incorporate electronic, magnetic, optical, and/or other types of storage media. Note that the memory 1010 may have a distributed architecture, where various components are situated remotely from one another, but can be accessed by the processor 1002. The software in memory 1010 can include one or more computer programs, each of which includes an ordered listing of executable instructions for implementing logical functions. In the example of FIG. 9, the software in the memory 1010 includes a suitable operating system (O/S) 1014 and computer programs 1016. The operating system 1014 essentially controls the execution of other computer programs and provides scheduling, input-output control, file and data management, memory management, and communication control and related services. The program(s) 1016 may include various applications, add-ons, etc. configured to provide end-user functionality with the test device 1000. For example, example programs 1016 may include a web browser to connect with a server for transferring OTDR measurement data files, a dedicated OTDR application configured to control OTDR acquisitions by the OTDR acquisition device 1018, set OTDR acquisition parameters, analyze OTDR traces obtained by the OTDR acquisition device 1018 and display a GUI related to the test device 1000. For example, the dedicated OTDR application may embody an OTDR analysis module configured to analyze acquired OTDR traces in order to derive the splice loss, and produce OTDR measurement data files.

Moreover, the memory 1010 may include a non-transitory computer-readable storage medium having computer readable code stored thereon for programming a computer, server, appliance, device, processor, circuit, etc. to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

It is noted that, in some embodiments, the I/O interfaces 1004 may be provided via a physically distinct mobile device (not shown), such as a handheld computer, a smartphone, a tablet computer, a laptop computer, a wearable computer or the like, e.g., communicatively coupled to the test device 1000 via the radio 1006. In such cases, at least some of the programs 1016 may be located in a memory of such a mobile device, for execution by a processor of the physically distinct device. The mobile may then also include a radio and be used to transfer OTDR measurement data files toward a remote test application residing, e.g., on a server.

It should be noted that the OTDR device shown in FIG. 9 is meant as an illustrative example only. Numerous types of computer systems are available and can be used to implement the OTDR device.

Example of OTDR Acquisition Device Architecture

Figure 10:
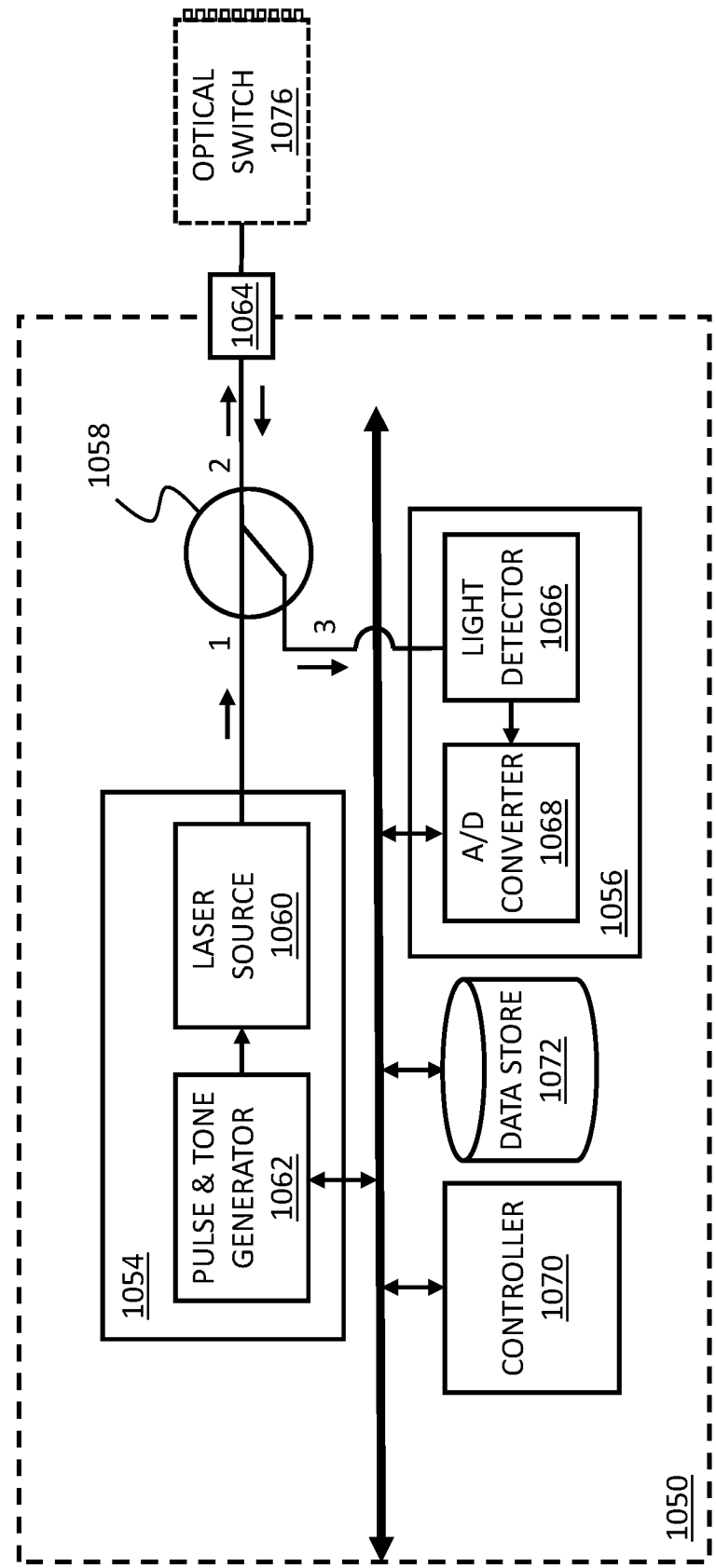
FIG. 10 is a block diagram illustrating an example architecture of an OTDR acquisition device, tone generator and tone detector of the test unit of FIG. 9.

FIG. 10 is a block diagram an embodiment of an OTDR acquisition device 1050 which may embody the OTDR acquisition device 1018 of the test device 1000 of FIG. 9.

The OTDR acquisition device 1050 is connectable toward the tested optical fiber link via an output interface 1064 and an optional optical switch 1076, for performing OTDR acquisitions toward the optical fiber link under test. The OTDR acquisition device 1050 comprises conventional optical hardware and electronics as known in the art for performing OTDR acquisitions over an optical fiber link.

The OTDR acquisition device 1050 comprises a light generating assembly 1054, a detection assembly 1056, a directional coupler 1058, as well as a controller 1070 and a data store 1072.

The light generating assembly 1054 is embodied by a laser source 1060 driven by a pulse & tone generator 1062 which is used to generate the OTDR test signal comprising test light pulses having desired characteristics, and to generate the tone signal. In this regard, the pulse & tone generator 1062 may comprise a frequency modulator configured to modulate the light source at a tone frequency. As known in the art, the light generating assembly 1054 is adapted to generate test light pulses of varied pulse widths, repetition periods and optical power through a proper control of the pattern produced by the pulse generator 1062. One skilled in the art will understand that it may be beneficial or required by the application to perform OTDR measurements at various different wavelengths. For this purpose, in some embodiments, the light generating assembly 1054 is adapted to generate test light pulses having varied wavelengths by employing a laser source 1060 that is tunable for example. It will be understood that the light generating assembly 1054 may combine both pulse width and wavelength control capabilities. Of course, different and/or additional components may be provided in the light generating assembly, such as modulators, lenses, mirrors, optical filters, wavelength selectors and the like.

The light generating assembly 1054 is coupled to the output interface 1064 of the OTDR acquisition device 1050 through a directional coupler 1058, such as a circulator, having three or more ports. The first port is connected to the light generating assembly 1054 to receive the test light pulses therefrom. The second port is connected toward the output interface 1064. The third port is connected to the detection assembly 1056. The connections are such that test light pulses generated by the light generating assembly 1054 are coupled to the output interface 1064 and that the return light signal arising from backscattering and reflections along the optical fiber link 110 is coupled to the detection assembly 1056.

The detection assembly 1056 comprises a light detector 1066, such as a photodiode, an avalanche photodiode or any other suitable photodetector, which detects the return light signal corresponding to each test light pulse, and an analog to digital converter 1068 to convert the electrical signal proportional to the detected return light signal from analog to digital in order to allow data storage and processing. It will be understood that the detected return light signal may of course be amplified, filtered or otherwise processed before analog to digital conversion. The power level of return light signal as a function of time, which is obtained from the detection and conversion above, is referred to as one acquisition of an OTDR trace. One skilled in the art will readily understand that in the context of OTDR methods and systems, each light acquisition generally involves propagating a large number of substantially identical light pulses in the optical fiber link and averaging the results, in order to improve the Signal-to-Noise Ratio (SNR). In this case, the result obtained from averaging is herein referred to as an OTDR trace.

Of course, the OTDR acquisition device 1050 may also be used to perform multiple acquisitions with varied pulse widths to obtain a multi-pulsewidth OTDR measurement.

The OTDR acquisition device 1050, and more specifically the light generating assembly 1054 is controlled by the controller 1070. The controller 1070 is a hardware logic device. It may comprise one or more Field Programmable Gate Array (FPGA); one or more Application Specific Integrated Circuits (ASICs) or one or more processors, configured with a logic state machine or stored program instructions. When the OTDR acquisition device 1050 is in operation, the controller 1070 is configured to control the OTDR measurement process. The controller 1070 controls parameters of the light generating assembly 1054 according to OTDR acquisition parameters that are either provided by the operator of the OTDR software or otherwise determined by program(s) 1016.

The data store 1072 may be used to cumulate raw data received from the detection assembly 1056, as well as intermediary averaged results and resulting OTDR traces. The data store 1008 may include any of volatile memory elements (e.g., random access memory (RAM, such as DRAM, SRAM, SDRAM, and the like)) or the like and it may be embedded with the controller 1070 or distinct.

The OTDR traces acquired by the OTDR acquisition device 1050 may be received and analyzed by one or more of the computer programs 1016 and/or stored in data store 1008 for further processing.

It should be noted that the architecture of the OTDR acquisition device 1050 as shown in FIG. 10 is meant as an illustrative example only. Numerous types of optical and electronic components are available and can be used to implement the OTDR acquisition device.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

In FIG. 10, the tone generator and the OTDR source use the same laser source 1060. However, in other embodiments, distinct light sources may be used. If so, the two light sources may have different wavelengths. If difference light sources at different wavelengths are used, they may be combined toward the output port using a wavelength-division multiplexer. This optionally allows to perform concurrent continuity and splice quality testing.

The embodiments described above are intended to be exemplary only. The scope of the invention is therefore intended to be limited solely by the appended claims.

The invention claimed is:

1. A test system for assisting a splicing technician in optical fiber splices, the test system comprising:
 a first test unit and a second test unit to be connected toward opposite ends of an optical fiber link comprising a first fiber span and second fiber span to be spliced, each test unit having at least one output port and comprising:
- an OTDR acquisition device for performing at least one OTDR acquisition toward said output port in order to test a quality of the splice, wherein each OTDR acquisition is performed by propagating in the optical fiber link under test, a pulsed test signal and detecting corresponding return light from the optical fiber link so as to obtain an OTDR trace representing backscattered and reflected light as a function of distance in the optical fiber link;
- a tone generator to produce a tone optical signal toward the output port; and
- a tone detector to detect a presence of a tone signal produced by the tone generator of the opposite test unit and received via the output port, in order to test a continuity of the optical fiber link; and
- a test application comprising computer instructions to be executed on a wireless portable device used by the splicing technician and in communication with the first test unit and the second test unit, the test application comprising a user interface to display results of continuity tests performed using the first test unit and the second test unit and results of splice quality tests performed by at least one of the first test unit and the second test unit.

2. The test system as claimed in claim 1, wherein said user interface comprises a user input for the technician to trigger at least one of the test units to launch a splice quality test.

3. The test system as claimed in claim 1, further comprising a test orchestrator in communication with the first test unit and the second test unit, and configured to monitor results of continuity tests performed by the first test unit and the second test unit and to trigger at least one of the test units to launch a splice quality test.

4. The test system as claimed in claim 3, further comprising a network server in communication with the first test unit and the second test unit, the network server running a server-based application comprising the test orchestrator.

5. The test system as claimed in claim 1, further comprising a hand-held tone detector to be connected, at a splice location, to one of the first fiber span and the second fiber span, in order to allow the splicing technician to identify proper fiber spans to be spliced together from a presence of a tone signal propagating in a fiber span.

6. The test system as claimed in claim 1, wherein each test unit comprises a plurality of output ports and further comprises an optical switch to connect the OTDR acquisition device, the tone generator and the tone detector toward a selected one of the output ports in order to assist the technician in performing a splice along the optical fiber link connected to the selected one of the output ports.

7. The test system as claimed in claim 6, wherein said user interface comprises a user input for the splicing technician to trigger the optical switch to another optical fiber link to be spliced, via a test orchestrator.

8. The test system as claimed in claim 1, wherein a same laser source is used to generate both the OTDR test signal and the tone signal, and wherein the tone generator comprises a frequency modulator configured to modulate said laser source at a tone frequency.

9. The test system as claimed in claim 1, wherein a splice quality test comprises OTDR acquisitions performed by both said first test unit and said second test unit to derive a splice loss of a splice between said first fiber span and said second fiber span using bidirectional OTDR analysis.

10. The test system as claimed in claim 1, wherein the second test unit is integrated in the wireless portable device.

11. A method for assisting a technician in optical fiber splices using a first and a second test unit to be connected toward opposite ends of an optical fiber link, the optical fiber link comprising a first fiber span and a second fiber span to be spliced, each test unit having at least one output port, the method comprising:
- at least one of the first test unit and the second test unit activating a tone generator to produce a tone optical signal toward an output port;
- at least the other one of the first test unit and the second test unit detecting, using a tone detector, a presence of the tone optical signal produced by the tone generator of the opposite test unit and received via the output port in order to test a continuity of the optical fiber link;
- on a portable device used by the splicing technician and in communication with the first test unit and the second test unit, displaying a result of a continuity test performed using the first test unit and the second test unit in a user interface, whereby the splicing technician can verify that the spliced fiber spans match;
- after the splice is completed, at least one of the first test unit and the second test unit conducting a splice quality test toward the optical fiber link, the splice quality test comprising performing at least one OTDR acquisition toward the output port; and
- on the portable device used by the splicing technician, displaying a result of the splice quality test, whereby the splicing technician can be informed about the splice quality.

12. The method as claimed in claim 11, wherein the splice quality test is launched upon a user input by the technician on the portable device.

13. The method as claimed in claim 11, further comprising a test orchestrator monitoring results of continuity tests performed by the first test unit and the second test unit and triggering at least one of the test units to launch a splice quality test.

14. The method as claimed in claim 13, wherein the test orchestrator is a server-based application running on a network server in communication with the first test unit and the second test unit.

15. The method as claimed in claim 11, wherein the tone optical signal is detectable by hand-held tone detector to be connected, at a splice location, to one of the first fiber span and the second fiber span, in order to allow the splicing technician to identify proper fiber spans to be spliced together, from a presence of a tone optical signal propagating in a fiber span.

16. The method as claimed in claim 11, wherein each test unit comprises a plurality of output ports, the method further comprising:
- the first test unit and the second test unit each selecting, using an optical switch, a selected output port among said plurality of output ports, to which to connect the OTDR acquisition device, the tone generator and the tone detector in order to assist the technician in performing a splice along the optical fiber link connected to the selected one of the output ports.

17. The method as claimed in claim 16, wherein the first test unit and the second test unit are in communication with a network server running a server-based application, the method further comprising the server-based application controlling the operation of the optical switch, monitoring results of continuity tests and launching splice quality tests of each test unit.

18. The method as claimed in claim 17, wherein the portable device is in communication with the server-based application and the method further comprising: the server-based application triggering the optical switch to select another optical fiber link to be spliced, upon a user input of the technician in said user interface.

19. The method as claimed in claim 11, the method further comprising:
   upon detecting link continuity, at least one of the first test unit and the second test unit monitoring splice completion using repeated OTDR acquisitions; and
   upon detection of splice completion, the at least one of the first test unit and the second test unit launching a splice quality test toward the optical fiber link.

20. The method as claimed in claim 11, the method further comprising:
   wherein the splice quality test comprises both said first test unit and said second test unit performing at least one OTDR acquisition toward the output port and deriving a splice loss of said splice using bidirectional OTDR analysis.

21. A non-transitory computer-readable storage medium comprising instructions that, when executed on a network server, cause a processor to perform the steps of:
   via a network communication between the network server and a first and a second test unit to be connected toward opposite ends of an optical fiber link comprising a first fiber span and second fiber span to be spliced, each test unit having at least one output port:
   a) triggering each of a first test unit and a second test unit to select a first output port among a plurality of output ports, using its respective optical switch;
   b) triggering at least one of the first test unit and the second test unit to activate its tone generator to produce a tone optical signal toward the at least one output port, at least the other one of the first test unit and the second test unit to detect a presence of a tone signal produced by the tone generator of the opposite test unit and received via the output port in order to test a continuity of the optical fiber link;
   c) sending the result of a continuity test to a wireless portable device used by a splicing technician, whereby the splicing technician can verify that the spliced fiber spans match;
   d) after the splice is completed, triggering a splice quality test toward the optical fiber link, the splice quality test comprising at least one of the first test unit and the second test unit performing an OTDR acquisition toward the output port;
   e) sending the result of the splice quality test to the wireless portable device used by the splicing technician, whereby the splicing technician can verify if a splice is successful; and
   f) triggering each of the first test unit and the second test unit to select a second output port among the plurality of output ports, using its respective optical switch and repeating steps b), c) d) and e).

* * * * *